March 3, 1953     F. P. DOWNEY     2,630,341
CONVEYER COUPLING
Filed Aug. 1, 1949
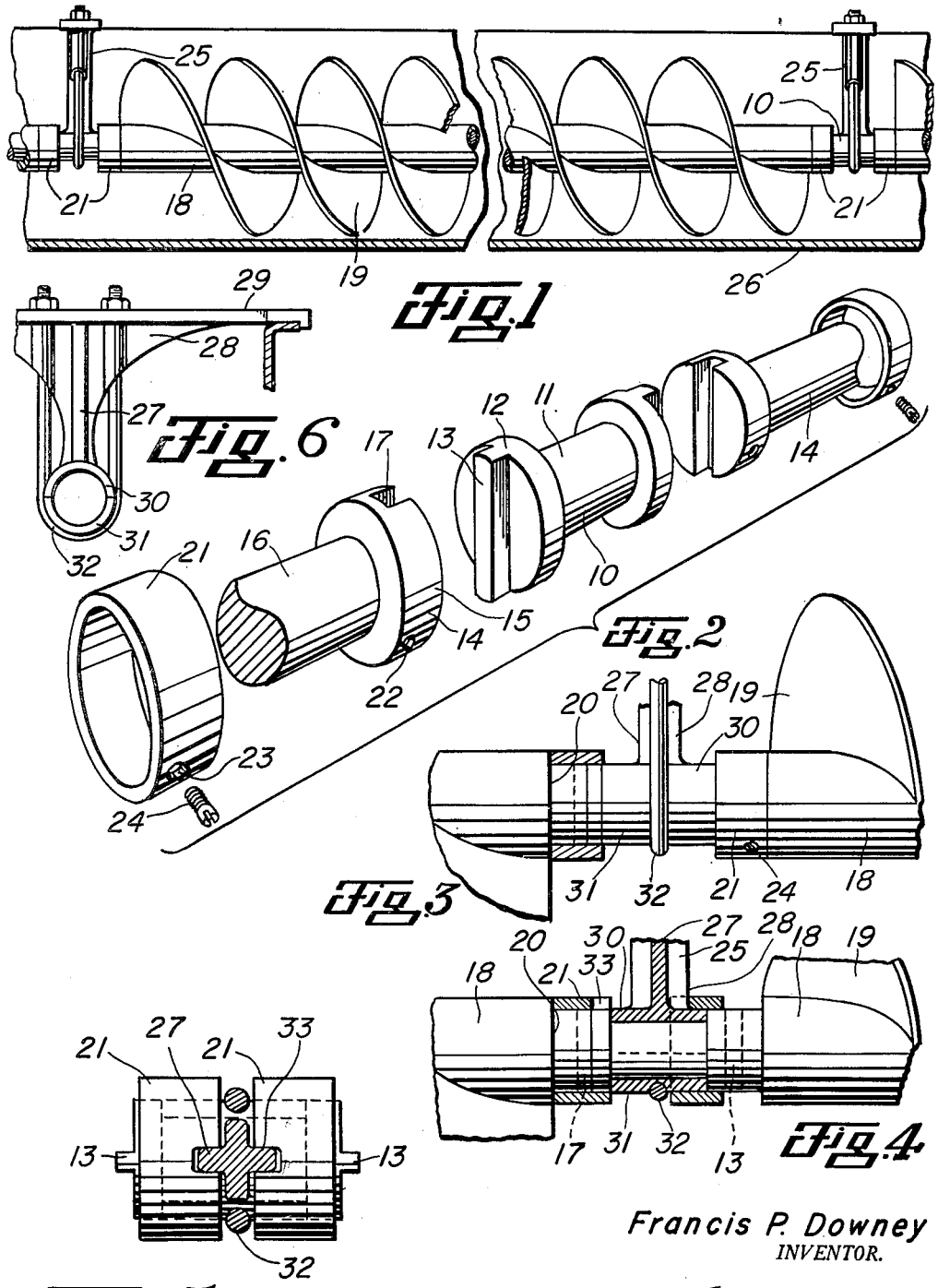
Francis P. Downey
INVENTOR.
BY Ahley & Ahley Patented Mar. 3, 1953

2,630,341

UNITED STATES PATENT OFFICE 2,630,341

CONVEYER COUPLING

Francis P. Downey, Kenedy, Tex.

Application August 1, 1949, Serial No. 107,955

3 Claims. (Cl. 287—2)

This invention relates to new and useful improvements in conveyor couplings.

One object of the invention is to provide in combination with the hanger of a screw conveyor, an improved coupling for the adjacent ends of the conveyor sections whereby bolts and pins and the objections thereto are eliminated.

Another object is to provide an improved coupling including a main section adapted to be rotatably mounted in the hanger with enlarged ends having projections beyond the hanger for engaging in recesses or grooves in gudgeons secured in the ends of the conveyor sections, whereby end thrust is sustained by the coupling and ready assembly and disconnection is had without the use of bolts or other fastenings; together with retaining rings covering the joints of the coupling and holding the main section and gudgeons in place.

A further object of the invention is to provide an improved coupling having a main hanger section adapted to be journaled in a hanger and gudgeons having means for securing them to the adjacent ends of conveyor screws, with male and female connections between the hanger section and gudgeons giving a limited play or flexibility and preventing undue wearing of the hanger bearing as well as providing for the removal of one conveyor screw without disturbing other screws.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a longitudinal, sectional view of portions of a screw conveyor having couplings constructed in accordance with the invention.

Fig. 2 is an exploded, perspective view of one of the couplings,

Fig. 3 is an elevation of the coupling and adjacent elements,

Fig. 4 is a view similar to Fig. 3, partly in section, of a modified form of the invention, and Fig. 5 is a horizontal, cross-sectional view of a portion of the modified form of coupling, and Fig. 6 is front elevation of one of the hangers.

In the drawing, the numeral 10 designates the main section or journal member of a coupling. This section includes a cylindrical spindle or arbor 11 having coupling members in the form of disks 12 at each end formed integral therewith. Each disk 12 has a diametrical tongue 13, preferably in cross-section, on its outer ends or face. The tongues 13 at opposite ends of the section are in alinement which is desirable in assembling the coupling, as is hereinafter explained. The spindle 11 is formed integral with the disks 12, and thus, a one-piece integral bearing spool is provided. A pair of gudgeons or coupling members 14 are provided and each includes a circular head in the form of a disk 15 having a coaxial shank 16 extending from one face thereof and provided with a diametrical groove 17 on its opposite face. The grooves 17 are also angular in cross-section so as to snugly receive the tongues 13. These grooves are of such depth that when the tongues are received therein the flat outer faces of the disks 12 and 14 are in intimate contact.

In the use of the coupling, the shanks 16 of the gudgeons are pressed into the tubular shaft or core 18 of a conveyor section 19 so that each end of the core abuts the inner face of one of the disks 15. The disks are larger in diameter than the core and the latter is welded to the inner face of each disk 15 as indicated at 20 in Fig. 3. In inserting the gudgeons 14 in the ends of the core, it is preferable to aline the grooves 17 at the ends thereof. A retaining collar or ring 21 is provided for encircling and connecting each pair of abutting disks 12 and 15. While any suitable fastening means may be employed, it is preferable to provide in each disk 15 a screw-threaded opening or sump 22 located to register with an aperture 23 in the corresponding ring 21. A set screw 24 is passed through each aperture 23 and screwed into the sump 22 therebelow, preferably to the point where the end of the screw is countersunk in said ring.

Conventional hangers 25 are provided for suspending the conveyor sections 19 within a trough 26 (Fig. 6). Each hanger includes a T-shaped body 27 having reinforcing webs 28 made integral with its upright portion or leg. The transverse portion or cross head 29 of the hanger overlies and may be bolted or otherwise fastened to the upper edge portions of the trough 26. A split bearing box 30, having a removable lower half or cap 31, is mounted on the lower end of the hanger leg and a U-bolt 32 engages around the bearing box and extends upwardly through the cross head 29 for clamping the lower bearing half in place. The length of the bearing box 30 is substantially equal to the length of the coupling spindle 11 so as to snugly receive the same and its external diameter is not greater than the diameter of the disks 12 whereby the rings 21 may be slid from said disks onto said box.

After the gudgeons 14 have been welded to the cores 18 of the conveyor sections 19, the latter are lowered into the trough and the hangers 25 are positioned between adjacent conveyor sections. It is noted that the main sections 10 of the couplings are carried by the bearings 30 of the hangers and the rings 21 are loosely confined upon the disks 12 of said sections, being slid inwardly toward the hanger body 27 so as to expose the tongues 13. Thus, the tongues may be engaged within the grooves 17 of the adjacent gudgeon disks 14 to permit alinement of said disks with the disks 12 and connection thereof by the rings and set screws 24. Manifestly, it is only necessary to slide the rings outwardly over the alined disks in order to join said disks.

It will be seen that the disks 12 and 14 sustain the end thrusts of the conveyor sections. Due to the tongue and groove connections, the coupling has a certain amount of flexibility which compensates ordinary misalinements between conveyor sections and reduces wear of the hanger bearing. The shearing of coupling bolts and pins is eliminated and the usual excessive backlash is obviated. By disposing the tongues 13 and grooves 17 in alinement, the parts are more readily assembled.

It is apparent that a single intermediate conveyor section may be removed without disturbing other conveyor sections. This is done by removing the set screws and sliding the rings inwardly toward the hanger body to expose the tongues 13 and grooves 17. When this has been accomplished, it is merely necessary to raise the conveyor section whereby the tongues and grooves are disengaged.

In Figs. 4 and 5, I have shown a slightly modified form of the invention for use with hangers having short length bearings or wide reinforcing webs which prevent the rings 21 from being slid far enough onto the bearing 30 to clear the tongues 13 and grooves 17. To overcome this difficulty, each ring has a notch 33 in its inner edge for receiving the web 28 and permits sufficient lateral movement of the ring to expose the tongue and groove as illustrated in Fig. 5. With the rings retracted, the gudgeons may be freely moved laterally. This arrangement makes it unnecessary to disconnect the hanger when the webs of the hangers are relatively wide or the bearings are relatively short in length.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A screw conveyor coupling including, a one-piece horizontal main section having annular portions at each end, a diametrical tongue across the outer vertical face of each annular portion of the main section, a pair of gudgeons each having a reduced shank and an annular disk at its outer end having a vertical face provided with a diametrical groove located to receive one of the tongues of the main section, and one-piece retaining rings normally surrounding the annular portions of the main section and the gudgeon disks and covering the ends of the tongues and grooves, whereby the gudgeon disks are held against diametrical displacement, each ring being movable laterally over the adjacent annular portion of the main section to expose the ends of the tongues and grooves and permit free vertical movement of the related gudgeon disk.

2. A screw conveyor as set forth in claim 1, wherein the main section has means for holding it against endwise displacement, whereby its annular portions are held free to receive the rings.

3. A screw conveyor as set forth in claim 1, and fastenings carried by each ring and engaging in the peripheries of the disks to secure the rings against lateral displacement.

FRANCIS P. DOWNEY.

REFERENCES CITED

The following references are of record in the file of this patent:

UNITED STATES PATENTS

| Number | Name | Date |
| --- | --- | --- |
| 408,953 | Chivill | Aug. 13, 1889 |
| 688,860 | Kay | Dec. 17, 1901 |
| 710,387 | Williams | Sept. 30, 1902 |
| 894,500 | Hitchon | July 28, 1908 |
| 961,958 | Hartley | June 21, 1910 |
| 1,557,569 | Eames | Oct. 20, 1925 |
| 2,147,878 | Burmeister | Feb. 21, 1939 |
| 2,362,856 | Strock | Nov. 14, 1944 |